United States Patent
Mc Lain et al.

(10) Patent No.: US 7,140,235 B2
(45) Date of Patent: Nov. 28, 2006

(54) LEAK DETECTION SYSTEM FOR A VEHICLE FUEL TANK

(75) Inventors: Kurt D. Mc Lain, Clarkston, MI (US); Michael J. Pitsch, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/060,948

(22) Filed: Feb. 18, 2005

(65) Prior Publication Data

US 2006/0185423 A1   Aug. 24, 2006

(51) Int. Cl.
*G01M 3/04* (2006.01)

(52) U.S. Cl. .................. 73/40; 73/40.5 R; 73/49.7; 73/118.1; 702/51

(58) Field of Classification Search ............ 73/40, 73/40.5 R, 49.7, 118.1; 702/51
See application file for complete search history.

(56) References Cited

U.S. PATENT DOCUMENTS

| | | | | |
|---|---|---|---|---|
| 6,321,727 B1* | 11/2001 | Reddy et al. | .............. | 123/520 |
| 6,357,288 B1* | 3/2002 | Shigihama et al. | .......... | 73/118.1 |
| 6,536,261 B1* | 3/2003 | Weldon et al. | .............. | 73/49.7 |
| 6,925,855 B1* | 8/2005 | De Ronne et al. | .......... | 73/49.7 |
| 6,974,251 B1* | 12/2005 | DeRonne et al. | .......... | 374/144 |
| 7,043,966 B1* | 5/2006 | Kuehn | ............ | 73/52 |
| 7,059,177 B1* | 6/2006 | Kobayashi et al. | ......... | 73/118.1 |
| 2003/0056573 A1* | 3/2003 | Miwa et al. | ............. | 73/40.5 R |
| 2003/0061864 A1* | 4/2003 | Wong et al. | ................... | 73/40 |
| 2005/0022584 A1* | 2/2005 | De Ronne et al. | .......... | 73/49.7 |

OTHER PUBLICATIONS

John Trajnowski, "Evaporative System Leak Detection", Ford Motor Company, May 23, 2002; pp. 1, 16-22. http://www.autocenter.weber.edu/OBD-CH/presentations/OEM-Evap-Cat-EGR-RespFinal.pdf (accessed Aug. 2, 2006).*

Vince Mow, "Cure Your Evap Headache", Motor Age, Jun. 2005; pp. 34-37. http://www.motorage.com/motorage/data/articlestandard/motorage/292005/169806/article.pdf (accessed Aug. 2, 2006).*

* cited by examiner

*Primary Examiner*—Daniel S. Larkin
*Assistant Examiner*—Samir M. Shah
(74) *Attorney, Agent, or Firm*—Christopher DeVries

(57) ABSTRACT

A leak detection system for a vehicle fuel tank includes a sensor that is responsive to a pressure within the fuel tank and that generates a pressure signal based thereon. A control module initiates an engine-off natural vacuum (EONV) test and determines a pressure change based on the pressure signal. The control module pauses the EONV test when the pressure change exceeds a pressure change threshold.

21 Claims, 4 Drawing Sheets

LEAK DETECTION SYSTEM FOR A VEHICLE FUEL TANK

FIELD OF THE INVENTION

The present invention relates to vapor leak diagnostic systems for vehicles, and more particularly to dynamic pressure change detection and correction for a vapor leak diagnostic system.

BACKGROUND OF THE INVENTION

A vehicle having an internal combustion engine includes a fuel tank that stores liquid fuel such as gasoline, diesel, methanol or other fuels. The liquid fuel evaporates into fuel vapors that increase pressure within the fuel tank. Evaporation is caused by energy that is transferred to the fuel tank. Sources of energy include radiation (e.g. sun energy), convection and conduction. Increased vapor pressure in the fuel system may effect the rate that vapor fuel is released into the atmosphere through a leak in the fuel system. Vapor leak diagnostic systems attempt to diagnose vapor fuel leaks.

Typically, vapor leak detection systems abort when a sudden pressure spike is detected. In some cases, a sudden pressure change can be indicative of a refueling event and an abort of the vapor leak detection algorithm is proper. However, in other cases, an event such as a trunk slam, door slam or vehicle rocking can cause a rapid pressure change in the fuel tank. In such cases, aborting the leak detection test reduces the robustness of the test and increases the time it takes to detect a leak.

SUMMARY OF THE INVENTION

Accordingly, the present invention provides a leak detection system for a vehicle fuel tank. The leak detection system includes a sensor that is responsive to a pressure within the fuel tank and that generates a pressure signal based thereon. A control module initiates an engine-off natural vacuum (EONV) test and determines a pressure change based on the pressure signal. The control module pauses the EONV test when the pressure change exceeds a pressure change threshold.

In one feature, the control module resumes the EONV test when the pressure change is below the pressure change threshold.

In another feature, the control module aborts the EONV test when the pressure change exceeds the pressure change threshold for an abort threshold time.

In another feature, the control module completes the EONV test when the EONV test has run for a threshold time.

In other features, the control module determines the pressure change as a difference between a current pressure and a prior pressure. The prior pressure is continuously updated when the pressure change is below the pressure change threshold. The prior pressure remains constant while the pressure change exceeds the pressure change threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
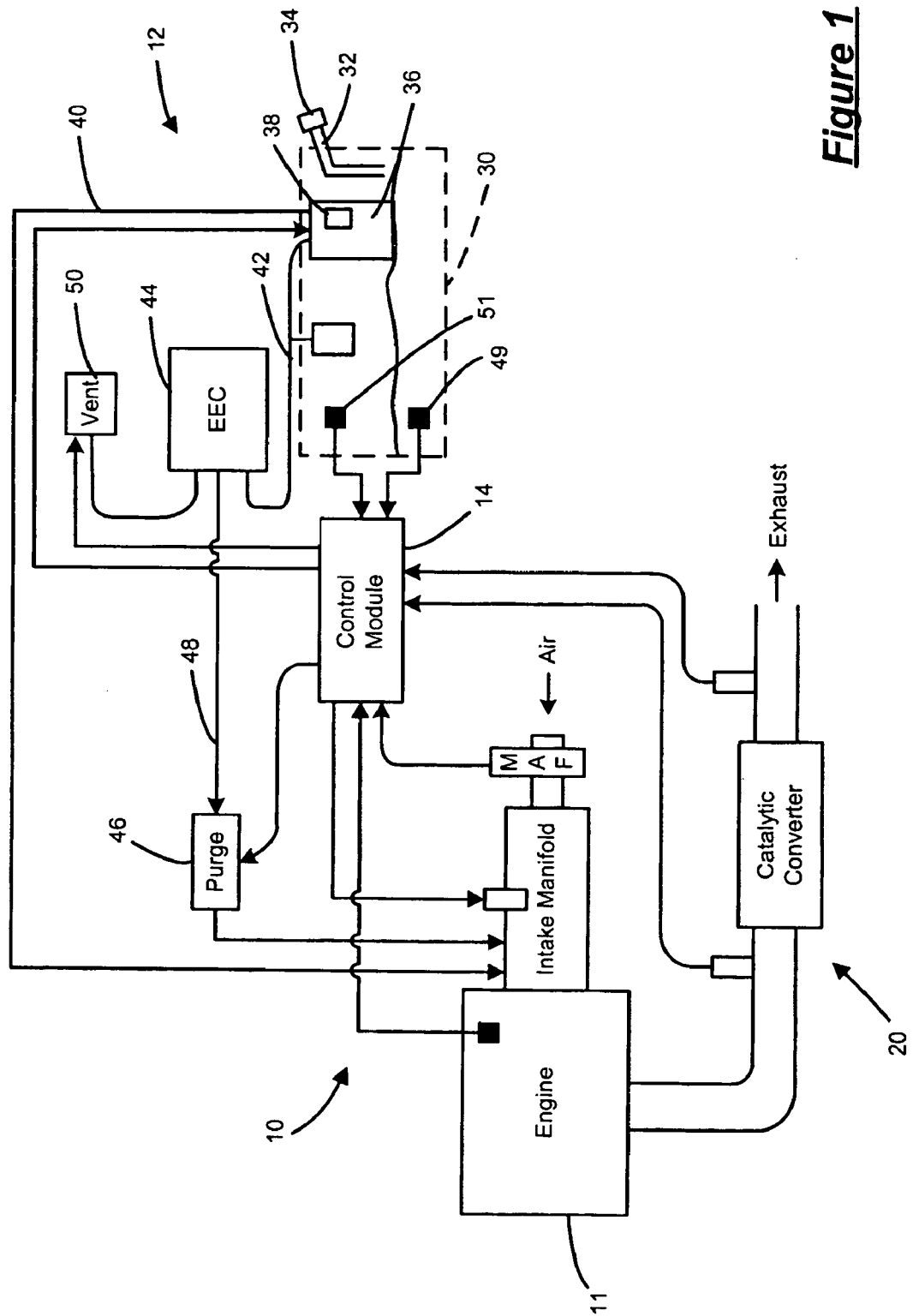
FIG. 1 is a functional block diagram of a vehicle including an engine off natural vacuum (EONV) test system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle 10 includes an engine 11 with a fuel system 12. The fuel system 12 selectively supplies liquid and/or vapor fuel to the engine 11 in a conventional manner. A control module 14 communicates with the engine 11 and the fuel system 12. While one control module 14 is shown, multiple control modules may be employed. The control module 14 monitors the fuel system 12 for leaks according to the leak detection system, as will be described below.

The fuel system 12 includes a fuel tank 30 that contains both liquid and vapor fuel. A fuel inlet 32 extends from the fuel tank 30 to an outer portion of the vehicle 10 to enable fuel filling. A fuel cap 34 closes the fuel inlet 32 and may include a bleed tube (not shown). A modular reservoir assembly (MRA) 36 is located inside the fuel tank 30 and includes a fuel pump 38, a liquid fuel line 40, and a vapor fuel line 42. The fuel pump 38 pumps liquid fuel through the liquid fuel line 40 to the engine 11.

Vapor fuel flows through the vapor fuel line 42 into an evaporative emissions canister (EEC) 44. A vapor fuel line 48 connects a purge solenoid valve 46 to the EEC 44. The control module 14 opens the purge solenoid valve 46 to enable vapor fuel flow to the engine 11 and closes the purge solenoid valve 46 to disable vapor fuel flow to the engine 11. The purge solenoid valve 46 may also be positioned between fully open and fully closed positions for partial vapor flow.

The control module 14 modulates a canister vent valve 50 to selectively enable air flow from atmosphere through the EEC 44. A fuel level sensor 49 and a vapor pressure sensor 51 are located within the fuel tank 30 to provide fuel level and pressure signals respectively, which are output to the control module 14. The control module 14 periodically initiates an engine off natural vacuum (EONV) test, or leak detection test, to ensure proper sealing of the fuel system 12. The EONV test monitors pressure within the fuel tank 30 to determine whether a leak is present. Leak detection can be affected by events that disrupt the pressure within the fuel tank 30, such as door slams and refueling.

The leak detection system of the present invention monitors the pressure signal generated by the vapor pressure sensor 51 to either pause the EONV test or abort the EONV test. More specifically, the leak detection system determines whether a sudden pressure increase is temporary (i.e., resulting from a trunk slam, door slam and/or vehicle rocking) or whether the sudden pressure increase is permanent (i.e., resulting from a fuel filling event). If the pressure increase is temporary, the leak detection system pauses the EONV test until the pressure stabilizes. If the pressure increase is permanent, the leak setection system aborts the EONV test.

Figure 2:
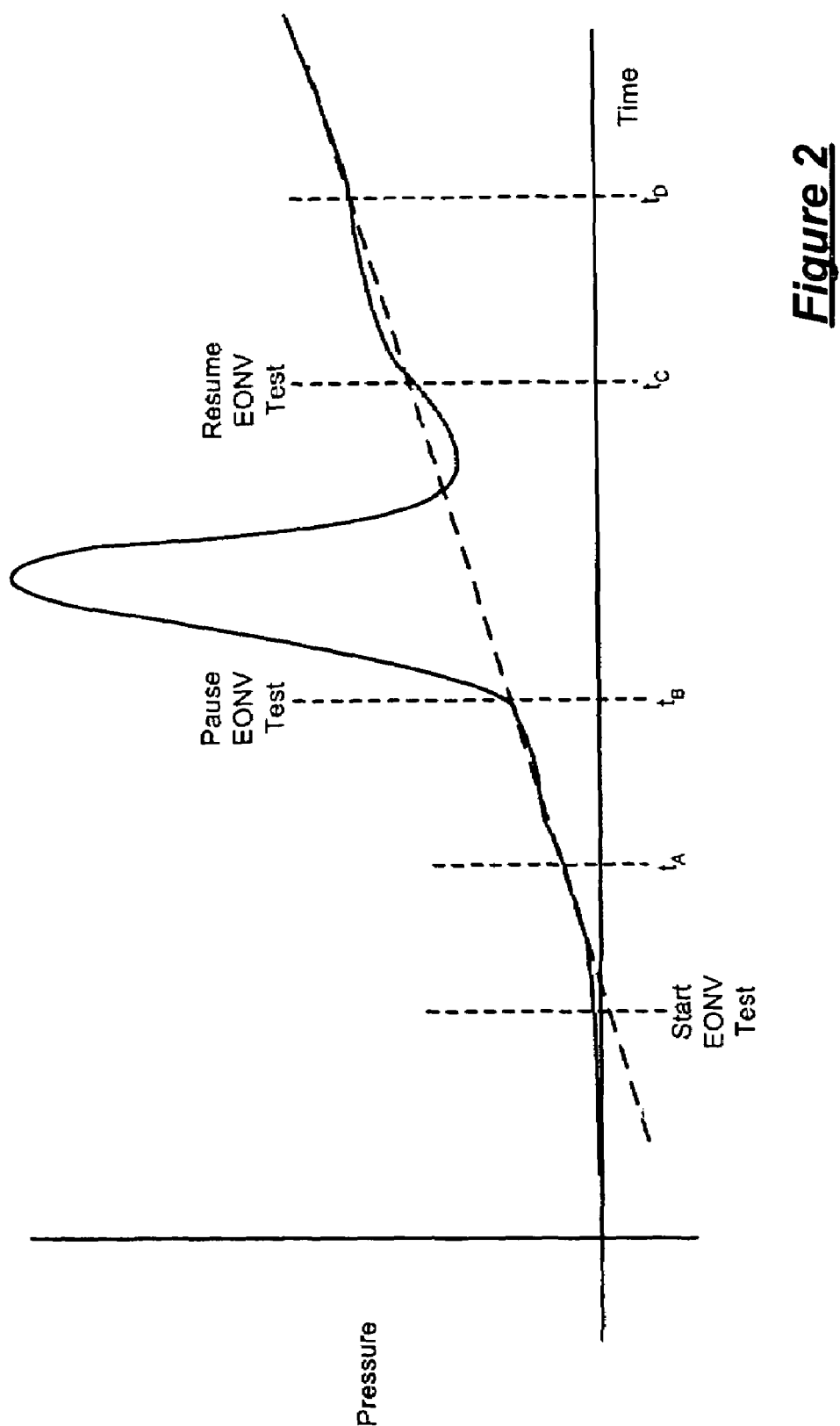
FIG. 2 is a graph illustrating a fuel tank pressure including a pressure spike.

Referring now to FIG. 2, a graph illustrates an exemplary pressure signal that includes a temporary pressure increase or pressure spike. As the pressure increases, leak detection is validated based on continuously monitoring a pressure change ($\Delta P$). $\Delta P$ is calculated as the difference between a prior pressure reading ($P_{PRIOR}$) and a current pressure reading ($P_t$). As explained in further detail below, $P_{PRIOR}$ is a prior pressure reading and can include in immediately prior pressure reading ($P_{t-1}$) or a pressure reading that was taken several intervals previously ($P_{t-n}$). If $\Delta P$ is below a pressure change threshold ($\Delta P_{THR}$), the leak detection for that period is valid and continues. For example, although there is a $\Delta P$ between times $t_A$ and $t_B$, and $t_C$ and $t_D$, they are insufficient to be detrimental to the results of the EONV test. If $\Delta P$ exceeds $\Delta P_{THR}$, the EONV test is suspended. For example, suspension of the EONV test would occur between times $t_B$ and $t_C$. The pressure eventually stabilizes at $t_C$ and the EONV test continues.

Figure 3:
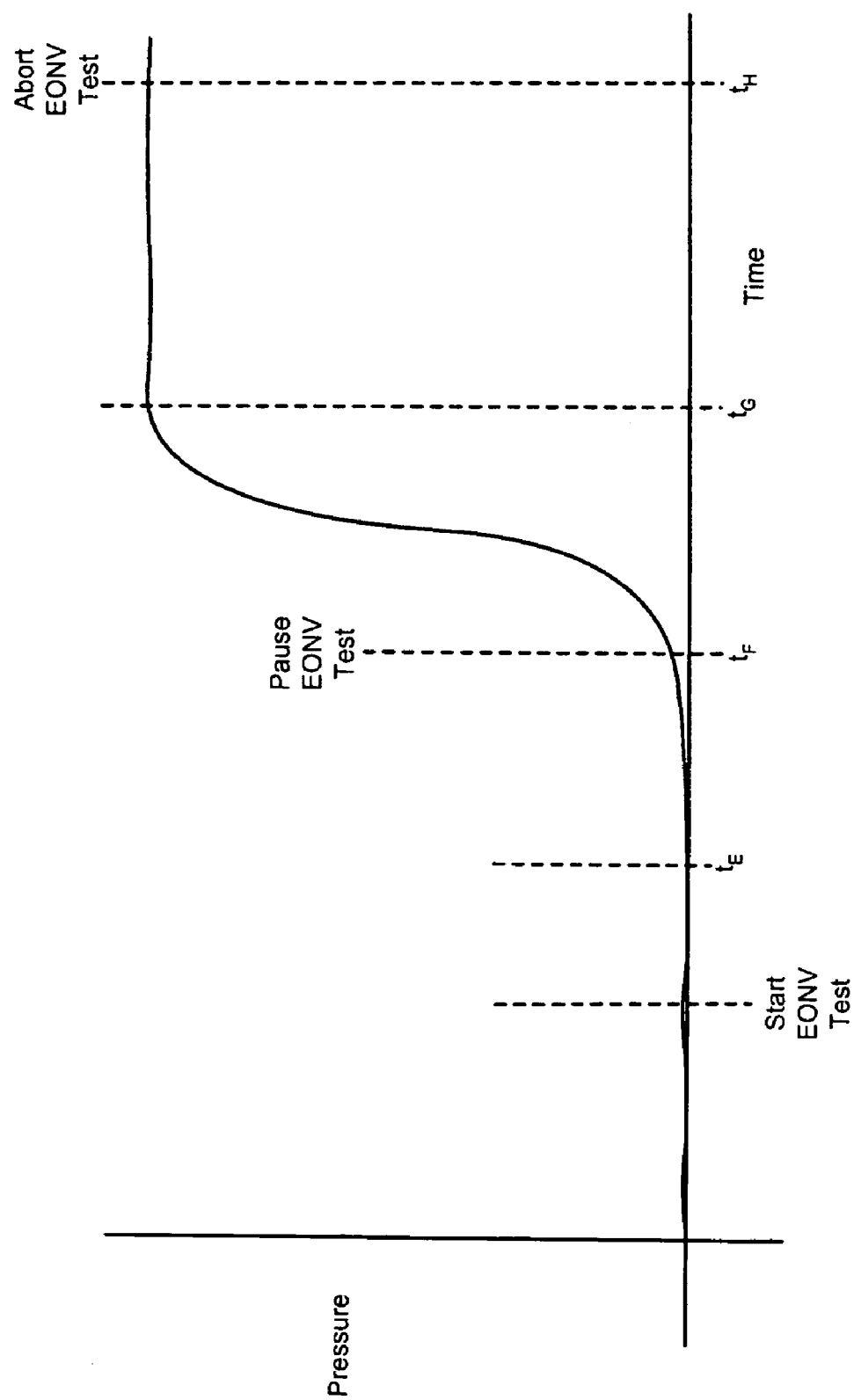
FIG. 3 is a graph illustrating the fuel tank pressure including a pressure increase indicative of a fuel filling event.

Referring now to FIG. 3, a graph illustrates an exemplary pressure signal that includes an extended or permanent pressure increase. Such a pressure increase can be caused by a refueling event. As similarly described above, $\Delta P$ is continuously monitored. Although there is a $\Delta P$ between times $t_E$ and $t_F$, they are insufficient to be detrimental to the results of the EONV test. Suspension of the EONV test occurs between times $t_F$ and $t_G$ because $\Delta P$ exceeds $\Delta P_{THR}$. Although the pressure eventually stabilizes at $t_G$, the pressure does not drop back down within a threshold time ($t_{THR}$) (i.e., the difference between $t_G$ and $t_H$). As a result, the EONV test is aborted at time $t_H$.

Figure 4:
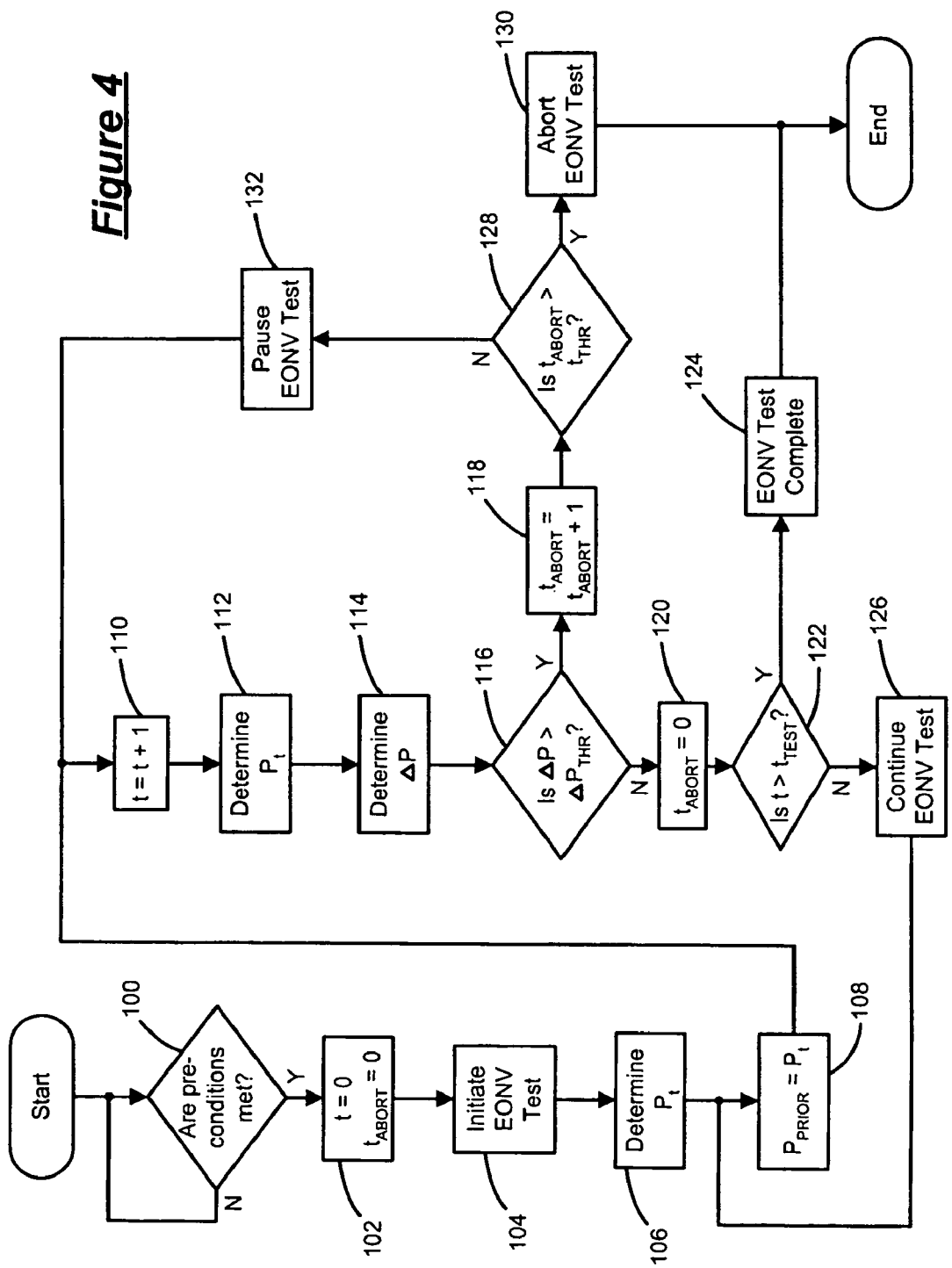
FIG. 4 is a flowchart illustrating the steps performed by the EONV test system of the present invention.

Referring now to FIG. 4, the steps performed by the leak detection system of the present invention will be described in detail. In step 100, control determines whether EONV pre-conditions are met. If the pre-conditions are not met, control loops back. If the pre-conditions are met, control sets t equal to 0 and sets an abort timer ($t_{ABORT}$) equal to 0 in step 102. In step 104, control initiates the EONV test. Control determines $P_t$ in step 106 and sets $P_{PRIOR}$ equal to $P_t$ in step 108.

In step 110, control increment t by 1. In step 112, control determines Pt and control determines $\Delta P$ in step 114. As discussed above, $\Delta P$ is determined as the difference between $P_{PRIOR}$ and $P_t$. In step 116, control determines whether $\Delta P$ is greater than $\Delta P_{THR}$. If $\Delta P$ is greater than $\Delta P_{THR}$, control continues in step 118. If $\Delta P$ is greater than $\Delta P_{THR}$, control resets $t_{ABORT}$ in step 120. Control determines whether t exceeds a test time threshold ($t_{TEST}$) in step 122. If t exceeds $t_{TEST}$, the EONV test is complete in step 124 and control ends. If t does not exceed $t_{TEST}$, the EONV test continues in step 126 and control loops back to step 108.

In step 118, control increments $t_{ABORT}$. Control determines whether $t_{ABORT}$ exceeds $t_{THR}$ in step 128. $t_{THR}$ is the maximum time allowed for the pressure to return to within a range of $t_{REF}$ before determining that $\Delta P$ indicates an extended pressure increase (e.g., refueling event). If $t_{ABORT}$ exceeds $t_{THR}$, control aborts the EONV test in step 130 and control ends. If $t_{ABORT}$ does not exceed $t_{THR}$, control pauses the EONV test in step 132 and control loops back to step 110. $P_{PRIOR}$ is continuously updated if $\Delta P$ less than $\Delta P_{THR}$. If $\Delta P$ exceeds $\Delta P_{THR}$, $P_{PRIOR}$ remains at the last $P_t$ prior to $\Delta P$ exceeding $\Delta P_{THR}$. In this manner, control determines whether the pressure has returned to within an acceptable range of $P_{PRIOR}$ to continue the EONV test.

The leak detection system of the present invention enables an EONV test to be paused in the event that a pressure spike occurs as a result of a trunk slam, door slam, vehicle rocking or any other external events. In this manner, the EONV test is not prematurely aborted as the result of a temporary pressure fluctuation. Further, the leak detection system of the present invention detects external events based on the pressure signal without requiring signal input from a door switch, trunk switch or any other type of switch and/or sensor. This direct method of detection and correction conserves system resources, enables the EONV test to run more frequently and decreases the time it takes to complete.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A leak detection system for a vehicle fuel tank, comprising:
   a sensor that senses pressure within said fuel tank and that generates a pressure signal based thereon; and
   a control module that initiates an engine-off natural vacuum (EONV) test, that determines a pressure change based on said pressure signal, that pauses said EONV test when said pressure change exceeds a pressure change threshold, and that resumes said EONV test when said pressure change is below said pressure change threshold.

2. The leak detection system of claim 1 wherein said control module aborts said EONV test when said pressure change exceeds said pressure change threshold for an abort threshold time.

3. The leak detection system of claim 1 wherein said control module completes said EONV test when said EONV test has run for a complete threshold time.

4. The leak detection system of claim 1 wherein said control module determines said pressure change as a difference between a current pressure and a prior pressure.

5. The leak detection system of claim 4 wherein said prior pressure is updated when said pressure change is below said pressure change threshold.

6. The leak detection system of claim 4 wherein said prior pressure remains constant while said pressure change exceeds said pressure change threshold.

7. A method of monitoring abortive pressure changes during leak detection for a vehicle fuel tank, comprising:
   generating a pressure signal based on a pressure within said fuel tank;
   initiating an engine-off natural vacuum (EONV) test;
   determining a pressure change based on said pressure signal;
   pausing said EONV test when said pressure change exceeds a pressure change threshold; and resuming said EONV test when said pressure change is below said pressure change threshold.

8. The method of claim 7 further comprising aborting said EONV test when said pressure change exceeds said pressure change threshold for an abort threshold time.

9. The method of claim 7 further comprising completing said EONV test when said EONV test has run for a complete threshold time.

10. The method of claim 7 further comprising determining said pressure change as a difference between a current pressure and a prior pressure.

11. The method of claim 10 further comprising updating said prior pressure when said pressure change is below said pressure change threshold.

12. The method of claim 10 further comprising holding said prior pressure constant while said pressure change exceeds said pressure change threshold.

13. A method of monitoring abortive pressure changes during leak detection for a vehicle fuel tank, comprising:
  generating a pressure signal based on a pressure within said fuel tank;
  initiating an engine-off natural vacuum (EONV) test;
  determining a pressure change based on said pressure signal; and
  pausing said EONV test and initiating a test abort timer when said pressure change exceeds a pressure change threshold.

14. The method of claim 13 further comprising resuming said EONV test when said pressure change is below said pressure change threshold.

15. The method of claim 13 further comprising incrementing said test abort timer while said pressure change exceeds said pressure change threshold.

16. The method of claim 13 further comprising resetting said test abort timer when said pressure change is below said pressure change threshold.

17. The method of claim 13 further comprising aborting said EONV test when said test abort timer exceeds an abort threshold time.

18. The method of claim 13 further comprising completing said EONV test when said EONV test has run for a complete threshold time.

19. The method of claim 13 further comprising determining said pressure change as a difference between a current pressure and a prior pressure.

20. The method of claim 19 further comprising updating said prior pressure when said pressure change is below said pressure change threshold.

21. The method of claim 19 further comprising holding said prior pressure constant while said pressure change exceeds said pressure change threshold.

* * * * *